Jan. 30, 1934.  J. G. DOUBLEDAY  1,944,879
SHOCK ABSORBER
Filed Feb. 24, 1933
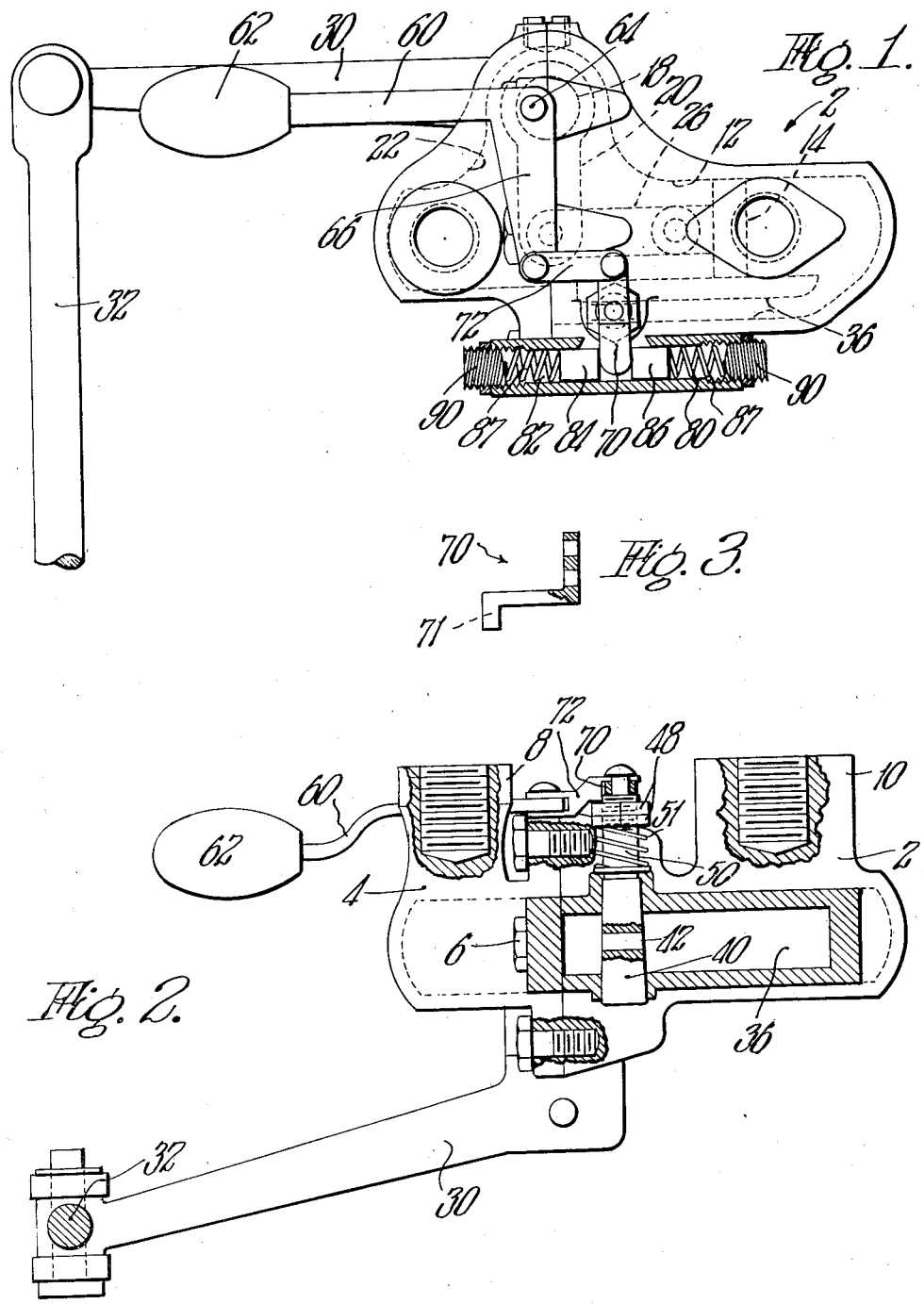
INVENTOR
Jason G. Doubleday
BY
Walter C. Ross
ATTORNEY Patented Jan. 30, 1934

1,944,879

UNITED STATES PATENT OFFICE 1,944,879

SHOCK ABSORBER

Jason G. Doubleday, Springfield, Mass.

Application February 24, 1933. Serial No. 658,400

2 Claims. (Cl. 188—88)

This invention relates to improvements in shock absorber devices and according to the principal objects of the invention means is associated therewith for controlling the action thereof. This is so that when the device is used in connection with a motor vehicle or the like having a frame resiliently mounted on an axle, the shock absorber of the invention may be disposed between the frame and axle and may control or check relative movements thereof.

As a special feature of the invention means is provided in connection with the mechanism of the shock absorber to regulate or control the action thereof which is operable to vary the action of the mechanism accordingly as the frame moves up and down.

Various other novel features and advantages of the invention will be more fully hereinafter referred to in connection with the accompanying description of the preferred form of the invention, reference being had to the accompanying drawing, wherein:

Fig. 1 is a side elevational view of a shock absorber device embodying the novel features of the invention with parts broken away for clearness.

Fig. 2 is an inverted plan view on the line 2—2 of Fig. 1 with parts in section to explain certain details of construction, and Fig. 3 is a side elevational view of a lever for operating the valve of the shock absorber.

Referring now to the drawing more in detail the invention will be fully described.

The shock absorbing device of the invention includes a body 2 which may consist of separate sections 2 and 4 bolted together as by bolts such as 6. Bosses or lugs 8 and 10 at the rear side of the shock absorber are adapted for securing the body to a vehicle frame or the like. This may be accomplished by tapping the parts 8 and 10 as shown for receiving bolts associated with a frame.

A cylinder bore 12 is provided in the body and a piston 14 is reciprocable therein. A shaft 18 is oscillatable in the body and has a lever 20 fixed thereto that is disposed within a chamber 22 of the body which is in communication with the cylinder bore 12.

The lower end of the lever 20 is connected as by a link 26 to the piston 14 and an arm or lever 30 is secured to one end of the shaft 18. With the shock absorber body fastened to the frame of the vehicle the arm 30 may be connected as by a link 32 to the axle of the vehicle. When so connected as the frame is moved relative to the axle the arm 30 is caused to swing and oscillate the shaft 18 so that the piston 14 is moved back and forth in its cylinder bore. A passageway or port 36 separate from the cylinder port 12 is provided in the body and as shown in Fig. 1 is in communication at its opposite ends with cylinder bore 12 at opposite sides of the piston 14.

As the frame moves relative to the axle so as to move the piston in its cylinder bore the action is such that fluid within the body is forced by the piston in one direction or the other through the port. The resistance to the flow of fluid through port 36 affects the action of the piston 14 and in this way the movements of arm 30 are controlled and thereby movements of the frame relative to the axle are controlled.

It is desired according to this invention that the movement of the piston and consequently the movements of the frame and axle be checked when the vehicle runs over rough spots in the roadway so as to move the frame suddenly with respect to the axle. At such times there is a tendency for the frame to move quickly relative to the axle and to overcome this means is provided to emphasize the checking action. For this purpose a valve 40 is rotatable in the port which has an opening 42 therethrough. As the valve 40 is turned the opening 42 may register more or less with the port 36 and restrict more or less the passage of fluid through the port.

The valve 40 may be tapered as shown and is held in proper seating position by a spring 51 disposed between a washer 46 bearing against the body and one or more nuts 48 in threaded engagement with a portion 50 of the valve which is disposed outside the body.

A lever 60 which is preferably weighted by a weight 62 is pivoted at 64 to the body and has an arm 66 depending therefrom. A lever 70 (see Fig. 3) is provided with upper and lower openings as shown, the lower one for receiving the end of valve 40 which is non-rotatably fixed therein in some suitable manner as by means of a drive fit, welding or the like. The upper opening shown in this lever 70 is for receiving the pin connecting link 72 with lever 70, as illustrated in Fig. 1.

As the lever 60 swings up and down on its pivot it will bring about rotative or oscillative movements of the valve 40. Thus, when the frame moves relative to the axle more particularly in an up and down direction the lever 60 is caused to swing in a vertical plane and rotate the valve 40 so as to change the position of the port 42 of the valve 40 with reference to the port 36 and in that way control the passage of fluid through the port.

Preferably it is desired to arrange the parts so that the valve is oscillated to control the passage of fluid through the port 36 in such a way that it is restricted to a greater extent when the frame moves up and down suddenly. This is so the device will act with a greater cushioning effect at the proper time in order to prevent jouncing up and down of the frame.

To control the operation of the valve and to return it to what may be called a neutral position wherein its port is in wide open position the following is provided. A hub part 80 at the lower side of the body has a bore 82 therethrough in which are slidable a pair of plugs 84 and 86 on either side of an extension 71 of the lever 70. Springs 87 on the outer side of the plugs bear against adjusting screws 90 in the ends of the bore to urge the plugs inwardly. The said plugs 84 and 86 are preferably a sliding fit in the bore 82.

As the lever 60 swings from its normal position to rotate the valve the lever 71 moves one or the other of the plugs against the action of its spring which tends to cushion the movement of the lever 70 and to return it to its neutral position wherein the opening through valve 42 is in full register with the port 36.

This prevents movements of the valve 40 when the frame may make only slight movements and when it is not desired to bring about the utmost checking action of the device.

Various changes and modifications may be made in the form of the invention without departing from the spirit and scope thereof and therefore what I prefer to herein obtain by Letters Patent of the United States is:

1. A shock absorber device comprising in combination, a body having a piston-bore therein and a port connected to opposite ends of said bore, a piston reciprocable in said bore, means connected to said piston for reciprocating the same, a valve rotatable in said port having an opening therethrough, a swinging weighted lever operatively connected to said valve, a pair of reciprocable members spring pressed towards one another and a part associated with said connections disposed between said members all adapted and arranged whereby as the valve is rotated in one direction or the other it is yieldingly urged to a neutral position.

2. A shock absorber device comprising in combination, a body having a piston-bore therein and a port connected to the bore at opposite ends, a piston reciprocable in said bore, means connected to said piston for effecting reciprocating movements thereof, a valve rotatable in said port provided with an opening therethrough, a weighted lever pivoted on said body, connections between said lever and valve whereby the latter is rotated by swinging movements of the former, the said body being provided with a plug bore, separate spring pressed plugs in said bore, and a member associated with said connections having a part extending from said valve between said plugs whereby rotation of the valve is resisted and yieldingly urged to a neutral position.

JASON G. DOUBLEDAY.